(12) United States Patent
He et al.

(10) Patent No.: US 9,954,424 B2
(45) Date of Patent: Apr. 24, 2018

(54) WIDE-FREQUENCY-BAND LARGE DISPLACEMENT ANGLE SHAKER

(71) Applicant: Zhejiang University, Hangzhou, Zhejiang (CN)

(72) Inventors: Wen He, Zhejiang (CN); Bo Tang, Zhejiang (CN); JinLin Li, Zhejiang (CN); ShuShi Jia, Zhejiang (CN); Jie Zhou, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 15/508,337

(22) PCT Filed: Jul. 3, 2015

(86) PCT No.: PCT/CN2015/083295
§ 371 (c)(1),
(2) Date: Mar. 2, 2017

(87) PCT Pub. No.: WO2016/034017
PCT Pub. Date: Mar. 10, 2016

(65) Prior Publication Data
US 2017/0288520 A1    Oct. 5, 2017

(30) Foreign Application Priority Data

Sep. 2, 2014  (CN) .......................... 2014 1 0442908

(51) Int. Cl.
*B06B 1/04*        (2006.01)
*H02K 33/00*    (2006.01)
(Continued)

(52) U.S. Cl.
CPC ............. *H02K 33/00* (2013.01); *B06B 1/045* (2013.01); *H02K 1/34* (2013.01); *B06B 2201/53* (2013.01); *G01D 18/00* (2013.01)

(58) Field of Classification Search
CPC ........ B06B 1/04; B06B 1/045; B06B 2201/53
(Continued)

(56) References Cited

U.S. PATENT DOCUMENTS 4,529,898 A * 7/1985 Voloshin .................. G01V 1/02
                                                              310/15
4,678,347 A * 7/1987 Butts ....................... B06B 1/045
                                                              384/43
(Continued)

FOREIGN PATENT DOCUMENTS

CN        1900660 A    1/2007
CN        1900661 A    1/2007
(Continued)

OTHER PUBLICATIONS

ISA/CN, International Search Report and Written Opinion of PCT Patent Application No. PCT/CN2015/083295 dated Oct. 13, 2015.
(Continued)

*Primary Examiner* — Burton Mullins
(74) *Attorney, Agent, or Firm* — Swanson & Bratschun, L.L.C.

(57) ABSTRACT

Provided is a broadband and large displacement angular vibrator, comprising an outer housing, a vibration table, a main spindle, a moving coil assembly, a magnetic circuit assembly, a holding brake assembly, a motor and closed loop control assembly thereof, an electric viscoelastic feedback control assembly, an air bearing, and an angular displacement sensor; the moving coil comprises a moving coil substrate and a coil; the moving coil substrate is fixed to the main spindle; the magnetic circuit assembly comprises a magnetic ring, a central magnetic pole, and magnets; the magnetic ring, central magnetic pole, magnets, and air gap form a closed magnetic circuit; the central magnetic pole is located inside the magnetic ring, the magnets are located between the magnetic ring and the central magnetic pole,
(Continued)

and the magnets are attached to the central magnetic pole; the outer housing has the holding brake assembly; the holding brake assembly comprises a brake lining, an oil distribution sleeve, and an oil reservoir having a piston; the brake lining and the oil distribution sleeve enclose a hydraulic oil chamber; when the hydraulic oil is pressed into the hydraulic oil chamber from the oil reservoir, the magnetic circuit assembly brakes; when the hydraulic oil flows back to the oil reservoir, the magnetic circuit assembly rotates with the motor rotor. The present angular shaker has the advantage of being able to switch between intermediate-frequency and low-frequency, and has small output waveform distortion.

10 Claims, 7 Drawing Sheets

(51) Int. Cl.
  *H02K 1/34* (2006.01)
  *G01D 18/00* (2006.01)
(58) Field of Classification Search
  USPC .............................................. 318/114; 73/663
  See application file for complete search history.

(56) References Cited

U.S. PATENT DOCUMENTS

| | | | |
|---|---|---|---|
| 5,351,545 A | * | 10/1994 | Lucas ..................... B06B 1/045 73/663 |
| 2014/0049122 A1 | * | 2/2014 | Matsumoto ........... G01M 7/027 310/12.16 |

FOREIGN PATENT DOCUMENTS

| | | | | |
|---|---|---|---|---|
| CN | 103471642 A | 12/2013 | | |
| CN | 104180842 A | 12/2014 | | |
| CN | 204064331 U | 12/2014 | | |
| DE | 102014201693 | * | 6/2015 | ............... B06B 1/04 |
| JP | 07333246 A | 12/1995 | | |

OTHER PUBLICATIONS

Peng et al. (2005), Metrology & Measurement Technology, 2005(6), 46-48 "Low Frequency Standard Angular Exciter in Metrology & Measurement Technology."

* cited by examiner

WIDE-FREQUENCY-BAND LARGE DISPLACEMENT ANGLE SHAKER

CROSS-REFERENCE TO RELATED APPLICATIONS

This application is filed pursuant to 35 U.S.C. 371 as a U.S. National Phase Application of PCT Patent Application No. PCT/CN2015/083295 filed on Jul. 3, 2015, which claims the priority to Chinese Patent Application No. 201410442908.8 filed on Sep. 2, 2014. The entire contents of each of the above-identified applications are hereby incorporated by reference.

FIELD OF THE INVENTION

The present invention relates to a broadband and large displacement angular vibrator, especially a kind of angular vibrator which is used for the calibration of angular vibration sensors and outputs low frequency and large displacement angular vibration.

BACKGROUND OF THE INVENTION

An angular vibrator is not only widely used for the calibration of dynamic characteristics of all kinds of angular vibration (angular displacement, angular velocity and angular acceleration) sensors, but also used for angular vibration environment test of various products.

At present, a large displacement angular vibrator, whose angular displacement is more than 180 degrees, usually adopts the structure that is based on a brushless motor. PENG Jun, HE Qun, XUE Jing-feng and SUN Hao published a paper with the title of Low Frequency Standard Angular Exciter in Metrology & Measurement Technology in 25(6) of 2005. A low frequency angular vibrator is mainly composed of a mechanical system, a control system, a measuring system and a signal processing system. The mechanical system is mainly composed of a main spindle, a table, an air bearing, a grating and a motor. The sensor to be calibrated is installed on the table, and the motor is used as a driving component for driving the rotation of the main spindle, and the air bearing takes advantage of homogenizing effect produced by gas film and attains the goal of improving the rotary precision and reducing the friction. The control system is mainly composed of a torque motor, a controller and an amplifying circuit. The controller is equipped with an electric current loop, a conversion loop, a speed loop and a position loop to improve the control performance. The computer is used to control the DAC to produce sinusoidal signals with different frequencies and amplitudes, which are sent to the control system, then the angular vibrator is driven to produce a sinusoidal angular motion with a certain frequency and amplitude. In the measuring system, the angle movement measured by a circular grating is used to be a feedback quantity for control, and a multi-channel data acquisition module is used for collecting electrical signal produced by grating and the sensor to be calibrated. Finally, the sensitivity and phase shift of the sensor to be calibrated are obtained in the signal processing system based on the calculation of the angle movement measured by the circular grating. The maximum output angular displacement (single peak value) of the system is more than 180 degrees.

The disadvantage of this low frequency angular vibrator lies in:

1. The low frequency angular vibration can only be produced in the angular vibrator, which is restricted by the response time of the motor.
2. The torque output from the angular vibrator will ripple because of the cogging effect in the motor itself, which will definitely effect on the output waveform of the vibrator although a brushless DC torque motor is used. If a brush DC torque motor is used, the output waveform from the angular vibrator will become worse because of the influence of the friction in the motor.

SUMMARY OF THE INVENTION

In order to overcome the shortcoming and insufficiency that the existing angular vibrators can only output low frequency and high distortion waveform, the present invention puts forwards a broadband and large displacement angular vibrator, which can output a waveform with low distortion.

A broadband and large displacement angular vibrator includes a shell, a vibration table, a main spindle which drives the vibration table to rotate, moving coil components, magnetic circuit components, brake components, a motor that drives the magnetic circuit components to rotate and its closed-loop control components, electrical viscoelastic feedback control components, an air bearing and an angular displacement sensor;

The characteristic of the present invention lies in: the main spindle and the moving coil components are fixedly connected, and the magnetic circuit components are fixedly connected with the motor rotor by a connector;

The moving coil components include a moving coil substrate which is connected to the main spindle, and a coil wrapped around the moving coil substrate, and the moving coil substrate is fixedly connected with the main spindle;

The magnetic circuit components include a magnetic ring, a central magnetic pole and magnets, and the closed magnetic circuit is produced by the magnetic ring, the central magnetic pole, the magnets and the air gap; the central magnetic pole is located in the magnetic ring and it is coaxial with the magnetic ring, and the magnets are located between the magnetic ring and the central magnetic pole, and the magnets affixed to the central magnetic pole. The moving coil components are located between the magnets and the magnetic ring, and the magnetic ring and the moving coil components are coaxial;

There are brake components on the shell for braking the magnetic circuit components, which include a brake lining, an oil distribution sleeve and an oil cylinder equipped with a piston. The brake lining includes an annular thin-wall deformation part, and the upper connection part and the bottom connection part, which are respectively located at the two ends of the thin-wall deformation part, and the upper connection part and the bottom connection part all contact thin-wall deformation part, and the upper connection part and the bottom connection part are respectively tightly-coupled with the oil distribution sleeve through sealing rings, and the brake lining and the oil distribution sleeve together make up a hydraulic oil vessel, and further including connecting channels in the oil distribution sleeve which connect the oil cylinder with the hydraulic oil vessel, and the sealing rings are between the oil distribution sleeve and the oil cylinder; when the hydraulic oil is pressed and flows from the oil cylinder into the hydraulic oil vessel, the thin-wall deformation part will press the magnetic ring and brake the magnetic circuit components; when the hydraulic oil flows back to the oil cylinder, there will be gaps between the thin-wall deformation part and the magnetic ring so the magnetic circuit components can rotate with the motor rotor.

When the sum of the maximum angular displacement (peak-peak value) that the vibration table can output and the angle that the effective wires in the moving coil occupies (effective wires mean the axial wires in the magnetic field) is greater than the fanlike angle of the magnets, the angular vibrator is then working in the large displacement and low frequency operating state, and in this state there are gaps between the thin-wall deformation part in the brake components and magnetic ring, so the motor will drive the magnetic circuit components to rotate with the moving coil components synchronously, which ensures the effective wires of the moving coil components are always located in the effective magnetic field formed by the magnetic circuit components. According to the existing technology, because the position of the magnetic circuit is fixed, the maximum angle, at which the moving coil components could rotate, cannot be beyond the maximum fanlike angle of a single fanlike magnet, which is 180 degrees. So the maximum angular displacement is only restricted at 180 degrees. However, the present invention makes the magnetic circuit components rotate with the moving coil components synchronously when the motor drives the magnetic circuit components to rotate, that is to say, the effective wires are always be located in the effective magnetic field covered by magnets when the magnetic circuit components keeps relatively static with the moving coil components, so it can realize that the output angular displacement of the moving coil components can be beyond 180 degrees, then the large angular displacement output from the angular vibrator could be realized; in addition, the moving coil components move in a unipolar magnetic field, which avoids the commutation torque ripple and electromagnetic torque ripple that will happen when a conventional motor is adopted to realize a large angular displacement, so the angular vibrator, which is put forwards in the present invention, can output the waveform with low distortion.

When the sum of the maximum angular displacement (peak-peak value) that the vibration table can output and the angle that the effective wires in the moving coil occupies is less than the fanlike angle of the magnets, the angular vibrator is then working in the small displacement and high frequency operating state. In this state, the motor powers down and is in non-working status, and the magnetic circuit components are locked by the brake components and the magnetic circuit components are braked, so the influence of the vibration from the magnetic circuit component on the output angular vibration waveform is avoided when the angular vibrator outputs a large angular acceleration, and the waveform distortion is further improved when the angular vibrator output high frequency and large acceleration vibration.

Further, the fittings include the rotating components and the connecting ring, and the rotating components include the spindle that is fixed on the center of base and the rotatable swivel installed on the spindle, and rolling bearings are equipped between the spindle and the swivel.

The spindle plays the role in positioning, and the swivel rotates around the spindle; the motor rotor, the swivel, the fittings, the central magnetic pole, the magnets and the magnetic ring together form a synchronous rotating body of revolution; as a power source, the motor rotor drives the whole rotating body to revolve. The size of the magnetic ring is greater than that of the swivel, so the connecting ring is designed as the above part is big, for the bottom part is small. The shape like two cylindrical rings; the big end of the connecting ring is fixed with magnetic ring and the small end is fixed with swivel.

The swivel includes the first connection part which is fixed with central magnetic pole, the second connection part which is fixed with motor rotor and the third connection part which is fixed with connecting ring. One side of the connecting ring is fixed with the magnetic ring and the other side is fixed with the third connection part of the swivel.

Because the size and the position of the central magnetic pole, the motor rotor and the connecting ring are all different, in order to fix the central magnetic pole, the motor rotor and the connecting ring together on the same swivel, the shape and structure of swivel are further limited as: the swivel includes the upper cylindrical ring section, the bottom cylindrical ring section and the linked section for connecting the upper and bottom cylindrical ring section, and the linked section is conical with a big bottom and a small top, and the upper cylindrical ring section is fixed with the central magnetic pole to be the first connection part, and an annular wing, which extends outward, is designed on the outer wall of the bottom cylindrical ring section and fixed with the motor rotator as the second connection part, and a step is designed on the linked section to support the connecting ring, and the surface of the step is fixed with the connecting ring to be the third connection part, and the whole swivel is made as one integrated body.

Further, an upper rolling bearing and a bottom rolling bearing are designed between the spindle and the swivel, and an upper bench is designed on the inner surface of the upper cylindrical ring section of the swivel to support the upper rolling bearing, and a round nut is designed on the spindle for pressing the inner ring of the upper rolling bearing, a washer is designed between the round nut and the upper rolling bearing, and a bottom bench is designed at the bottom of the bottom cylindrical ring section of the swivel to press the outer ring of the bottom rolling bearing, and a support board is designed at the bottom of the spindle to support the inner ring of the bottom rolling bearing.

The angular displacement of the motor is detected by an angular displacement sensor, furthermore, the first circular grating is designed on the connecting ring, and the first reading head and its mounting bracket is designed on an pressing plate, and the first circular grating and the first reading head together become the first angular displacement sensor to detect the movement of motor, and the pressing plate is fixed on the support base of the motor and is pressed on the motor stator to fix the motor stator, and the pressing plate is a ring-shaped connecting plate.

In order to cool the motor at work in time, the present invention further sets up the spiral cooling groove at the outer surface of motor stator, so the motor stator and motor support base together produce a sealed spiral cooling chamber, and sealing rings are designed between the motor stator and motor support base to prevent the leakage of coolant fluid. An upper sealing ring and a bottom sealing ring are designed at the upper and bottom end of spiral cooling chamber respectively, and the two seal grooves are designed on the motor stator to accommodate the two sealing rings, and the incoming channel and the escape channel for coolant liquid are designed on the motor support base.

Furthermore, the oil cylinder piston in the brake components is fixed with the pushrod of the brake air cylinder, the oil cylinder in the brake components contains a cylinder body, a piston that is adapted with the inner cavity of the cylinder body, seals and their adjustments that are designed on the cylinder body, the seals are sealed with the piston, and holding tanks are designed on the cylinder body to accommodate the seals and their adjustments, the steps for supporting the seals are formed on the holding tanks and the upper section of the cylinder body, and the sealing adjustments pressure the seals through the steps, so the sealing adjustments is used for adjusting the tightness of seals.

When the pushrod of the brake air cylinder is pushed downward, the hydraulic oil will be pressed from the oil cylinder to the hydraulic oil vessel, and the thin-wall deformation part will tightly compress the magnetic ring and brake the magnetic circuit components. When the brake air cylinder is reset and the hydraulic oil flows back to the oil cylinder, the thin-wall deformation part will return to its original shape, and there will be gaps between the thin-wall deformation part and the magnetic ring again.

The electrical viscoelastic feedback control components contains the second angular displacement sensor, a feedback unit, a signal generator, a subtracter, a PID controller, a power amplifier and the angular vibrator; the second angular displacement sensor includes the second reading head and second circular grating, and the second circular grating is installed on the vibration table, and the second reading head is installed on the bearing sleeve of the air bearing through a mounting rack; the second angular displacement sensor is used for detecting the angular displacement signal of the moving coil components and the vibration table, and the signal is input to the feedback unit, and the feedback unit amplifies the signal to be the first output signal, and the derivative of the signal is also got and then amplified to be the second output signal, and the output signal of the feedback unit is got after the first output signal and the second output signal are superimposed, and the difference between the output signal of the feedback unit and the standard signal generate by the signal generator is got to be a deviation signal, then the deviation signal is processed by the PID controller and then the output signal is amplified by the power amplifier, and drives the angular vibrator to move to realize the electrical viscoelastic feedback control for the rotating parts of the angular vibrator.

Due to the nonlinear problems of mechanical springs when they are working in large angular displacement, the output angular waveform from the angular vibrator will seriously distorted, but the electrical viscoelastic feedback control components are equivalent to a spring whose stiffness and damping are linear and adjustable, so it can improve and reduce the distortion of the output angular waveform from the angular vibrator.

The closed-loop control components for controlling the movement of the motor are composed of the second angular displacement sensor that detects the movement of moving coil components, a subtracter, a motor controller, a motor drive and the first angular displacement sensor that detects the angular displacement of the motor; its implementation processes include: the first angular displacement sensor detects the angular displacement of the motor and the result is input to the subtracter, and then do the subtract with the angular displacement signal detected by the second angular displacement sensor, and the deviation signal is processed by motor controller and then the result is input to the motor drive, whose output drives the motor to rotate, and this processes will make it sure that the moving coil components and magnetic circuit components will rotate synchronously.

Further, the air bearing includes a bearing sleeve and a bearing body, a main spindle sleeve is joined in the bearing body, and the bearing body is joined in the bearing sleeve, and bearing sleeve is fixed with bearing body, and a step is designed at the bottom of the main spindle to fit with the bearing body;

A circular inlet groove is designed on the outside surface of the bearing body, and an air inlet is designed on the bearing sleeve, which is connected with the inlet groove, and radial gas ports are designed on the bearing body to guide the gas to the gaps between the bearing body and the main spindle, and the upper axial gas ports are designed on the bearing body to guide the gas to the gaps between the bearing body and the vibration table, and the bottom axial gas ports are designed on the bearing body to guide the gas to the gaps between the bearing body and the step of the main spindle, and orifices are designed at the outlet ends of the radial gas ports, the upper axial gas ports and the bottom axial gas ports, respectively, and they are uniformly distributed along the circumferential direction.

The air inlet, the inlet groove, the radial gas ports, the upper axial gas ports and the bottom axial gas ports compose the inlet channel, and the air inlet is connected with the high pressure gas source.

The upper axial gas ports are connected with the first radial gas ports, which forms an upper T-like airway, and the bottom axial gas ports are connected with the second radial gas ports, which forms an bottom T-like airway, and the upper T-like airway and the bottom T-like airway are symmetrically arranged, and the first radial gas ports and the second radial gas ports are connected with the inlet groove.

A Gap between the upper end face of the bearing body and the bottom end face of the vibration table forms the gas film named the upper thrust gas film; an gap between the bottom end face of the bearing body and the upper end face of the step on the main spindle forms the gas film named the bottom thrust gas film; a gap between the bearing body inner surface and the main spindle outer surface forms the gas film named the axial neck part gas film; the upper thrust gas film, the bottom thrust gas film and the axial neck part gas film together make the main spindle and the bearing body do not touch with each other directly, then the friction is reduced, and the distortion of output waveform is reduced.

In order to optimize the exhaust performance of the air bearing and keep the gas film uniform and stable, we further limit the structure as: the main spindle is hollow to form an exhaust cavity, and the first exhaust channels are designed on the upper end of the main spindle to guide the gas between the bearing body and the vibration table to the exhaust cavity, and the second exhaust channels are designed on the bearing body to guide the gas between the main spindle and the bearing body to exhaust outside, and the exhaust port of the second exhaust channels is located outside of the main spindle step, and the second exhaust channels are evenly distributed on the bearing body and are isolated with the inlet groove.

The first exhaust channels include a circular groove that is designed on the upper surface of the main spindle, pores that discharge the gas between the bearing body and the vibration table into the circular groove and axial holes that discharge the gas in the circular groove into the exhaust cavity; the pores are multiple and uniformly distributed along the circular groove; the axial holes are also multiple and uniformly distributed along the circular groove; and the pores are opened along the radial direction of the main spindle upper surface, and the axial holes are opened along the main spindle axial direction.

The second exhaust channels include the radial exhaust hole and the axial exhaust hole, and one side of the radial exhaust hole is connected with the gas film between the bearing body and the main spindle, but the other side is connected with the axial exhaust hole; the air outlet of the axial exhaust hole is also the air outlet of the second exhaust channels; the radial exhaust hole guides the gas in the neck part gas film into the axial exhaust hole and then discharge from the axial exhaust hole to the outside.

The radial exhaust hole runs through the bearing body, and end caps are designed on the end of the radial exhaust holes where the inlet groove is connected, which avoids the gas in the second exhaust channels to flow into the inlet groove and keeps the second exhaust channels and the inlet groove independence with each other, and also make it convenient for the radial exhaust hole to be machined in the meantime.

Further, the shell includes a barrel fixed on the base and a damping block fixed on the bearing sleeve of the air bearing, and the brake components is installed between the barrel and the damping block; the exhaust cavity is connected with the space among the moving coil components, the central magnetic pole and the magnets; the gas in the upper thrust gas film is discharged into the exhaust cavity through the first exhaust channel, and then the gas flows into the space among the moving coil components, the central magnetic pole and the magnets, which plays the role in cooling the moving coil components; the second exhaust channels are connected with the space between the damping block and the moving coil components; the gas in neck part gas film is discharged into the space among the moving coil components and damping block through the second exhaust channels, which also plays the role in cooling the moving coil components; except the moving coil components, the gas from the first exhaust channels and the second exhaust channels finally flows through the exhaust path including the center holes on the central magnetic pole, the spindle and the base, and the air vent on the bottom surface of the base, and then goes into the atmosphere.

Further, the coil of the moving coil components is covered on the outer flank of the moving coil substrate, and the coil includes coil windings and insulation layers, which are alternatively set, and there is at least one coil winding layer. The insulation layers are made of the epoxy and the glass cloth, which will cover the coil winding completely.

Each coil winding includes the first coil and the second coil, and the first coil is counterclockwise winded from inside to outside, and the second coil is clockwise winded from outside to inside, and the first coil and the second coil are on the same layer, and wounded with multi-turn, each of which is composed by effective wires and connection conductors, and the galvanical effective wires produce ampere force when they are put in the magnetic field, and the connecting wires are put outside the magnetic field.

The equal-interval-distributed effective wires compose an ampere-force-occurring part, and the number of ampere-force-occurring parts is twice the number of coil windings, and each ampere-force-occurring part contains the same quantity of effective wires, and the epoxy is filled between each turn of the coil winding, and the coil windings are connected with each other in series or parallel.

When the coil windings is made, a copper plate is first made, which can cover the outer surface of the moving coil substrate exactly, and the line shape and line way of the coil winding are machined on the plate through wire-electrode cutting or carving, then the coil windings made of the copper plate are fixed on the outer surface of the moving coil substrate through winding, and at the same time the glass cloth is wound at the outer surface of the coil windings and the middle hollowed area and the epoxy is poured on the cloth, and the cloth is wound while the epoxy is poured. After the epoxy is solidified, the current coil winding and moving coil substrate will be machined to be a new smooth and flat cylindrical moving coil substrate through turning process. When the next layer of the coil winding is made, another copper plate will be prepared on the outer surface of the new moving coil substrate, and the new coil winding is wound in the same way as that of the former coil windings, and each ampere-force-occurring part of the moving coil windings should be kept alignment and overlapped with each other, and the other layers of coil windings are made in the same way.

The corner between the effective wires and the connecting wires of the coil windings should be keep smooth transitions to avoid the damage and stress concentration when processing and fixing the coil windings.

Because the direction of the current in the wires of the adjacent ampere-force-occurring part is opposite when they are wound, in order to make the ampere forces be superposed, the magnets is limited as follow: the magnets should be uniformly distributed along the circumference of the central magnetic pole; the magnetization direction of the magnets are radial, and the magnetization direction of the adjacent magnets is opposite, and the magnets are fixed on the central magnetic pole.

The advantages of the present invention are:

1. The broadband large displacement vibration is realized when being equipped with a brake components and a motor in the present invention. When the brake components brakes the magnetic circuit components and the motor is inactive, the dynamic characteristics of the system is only depended on the rotating components, whose main subject is the moving coil, in the angular vibrator, which means that the angular vibrator could work at high frequency, and the angular vibrator is working in the small displacement and high frequency state; when there are gaps between the brake components and the magnetic circuit components and the motor is active, the angular vibrator is then working in the large displacement and low frequency state, and the rotating components of the angular vibrator can output large displacement.

2. In the present invention, when the sum of the maximum angular displacement (peak-peak value) that the vibration table can output and the angle that the effective wires in the moving coil occupies is greater than the fanlike angle of the magnets, the angular vibrator is asked to work in the large displacement and low frequency operating state, and the motor is adopted to drive the magnetic circuit components to rotate, and make sure that the magnetic circuit components will rotate with the moving coil component synchronously, also with fast response, accurate positioning and good performance; the output angular displacement (single-peak value) of the angular vibrator can reach more than 180 degrees, which meets the demands for the calibration of angular vibration sensors with low frequency response and large angular displacement.

3. In the present invention, when the sum of the maximum angular displacement (peak-peak value) that the vibration table can output and the angle that the effective wires in the moving coil occupies is less than the fanlike angle of the magnets, the angular vibrator is then asked to work in the small displacement and high frequency operating state. Then the magnetic ring is braked by the brake components, where the air cylinder is adopted as power source, and the gas source comes from the same branch as air bearing, and the power source has advantages of smooth lock, simple structure and convenient operation, etc.

4. In the present invention, the permanent magnets are adopted in the magnetic circuit structure, where the excitation coil is eliminated, and the loss of the excitation system is reduced, and the efficiency of the energy conversion is improved, and the magnetic circuit structure is simple, compact and reliable for operation.

5. In the present invention, the air bearing support is adopted, and the formed upper thrust gas film, bottom thrust gas film and axial neck part gas film realize the axial and radial support for the rotating parts of the moving coil, and no contact support is realized for the rotating parts and the stationary parts through the gas films, which has the advantages of no friction or small friction, smooth running, improving the rotary accuracy of the rotating parts, improving the output waveform distortion from the angular vibrator and reducing the transverse oscillating quantity.

6. The coil windings of the moving coil components is machined by wire-electrode cutting or carving, which have the advantages of uniformly wiring, uniform stress, reducing the winding difficulty of the coil windings at the same time and simplifying the wiring process.

7. In the present invention, the electrical viscoelastic is adopted to control the equilibrium position of the rotating parts with the feedback technology. The traditional mechanical spring has the shortage of nonlinear, time-varying, hysteresis, and so on, which impact the output waveform distortion form the angular vibrator. However, the electrical viscoelastic based on feedback control technology has advantages of linear, time-invariant, no hysteresis, and so on, which reduce the output waveform distortion.

DETAILED DESCRIPTION OF THE INVENTION

Embodiment 1

Figure 1:
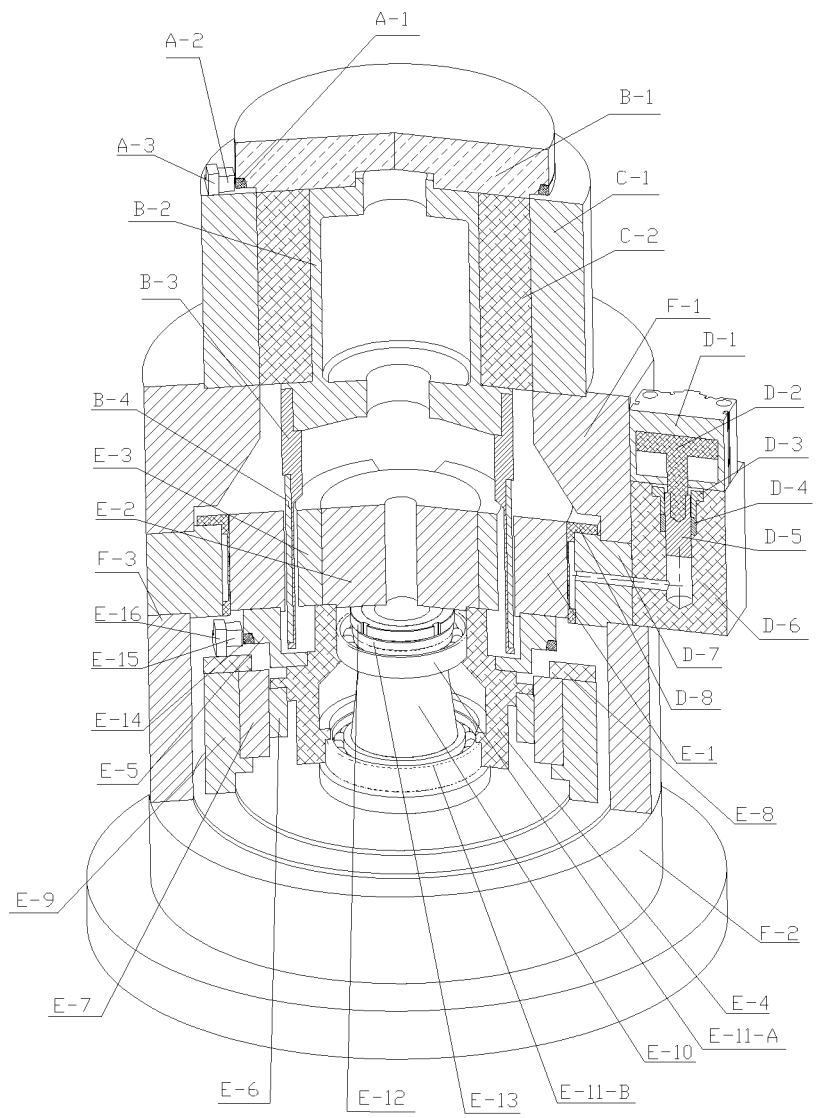
FIG. 1 is a whole structure diagram of the angular vibrator.
Figure 2:
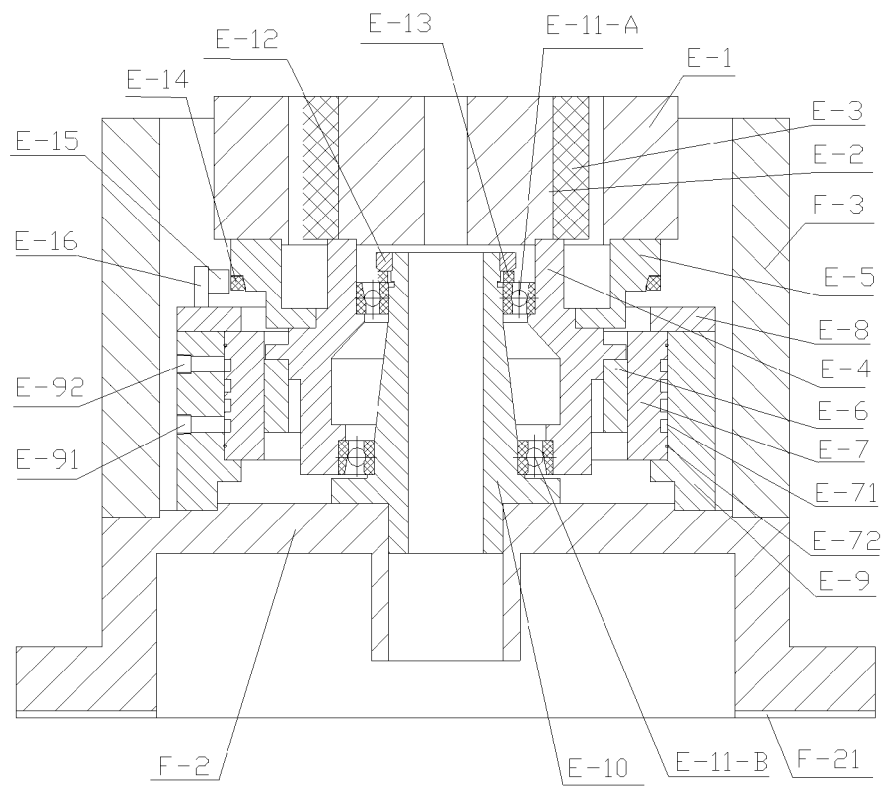
FIG. 2 is a schematic diagram of motor driving the magnetic circuit structure system.

FIGS. 1-8 as reference.

A broadband and large displacement angular vibrator includes a shell, a vibration table B-1, a main spindle B-2 which drives the vibration table B-1 to rotate, moving coil components, magnetic circuit components, brake components, a motor that drives the magnetic circuit components to rotate and its closed-loop control components, electrical viscoelastic feedback control components, an air bearing and an angular displacement sensor;

The main spindle B-2 and the moving coil components are fixedly connected, and the magnetic circuit components are fixedly connected with the motor E-6 rotor by a connector;

The moving coil components include a moving coil substrate B-3 which is connected to the main spindle B-2, and a coil B-4 wrapped around the moving coil substrate B-3, and the moving coil substrate B-3 is fixedly connected with the main spindle B-2;

The magnetic circuit components include a magnetic ring E-1, a central magnetic pole E-2 and magnets E-3, and the closed magnetic circuit is produced by the magnetic ring E-1, the central magnetic pole E-2, the magnets E-3 and the air gap; the central magnetic pole E-2 is located in the magnetic ring E-1 and it is coaxial with the magnetic ring, and the magnets E-3 are located between the magnetic ring E-1 and the central magnetic pole E-2, and the magnets affixed to the central magnetic pole E-2. The moving coil components are located between the magnets E-3 and the magnetic ring E-1, and the magnetic ring E-1 and the moving coil components are coaxial; when the alternating current is provided to the coil of moving coil components, the moving coil components will vibrate back and forth around the equilibrium position under the action of magnetic field.

There are brake components on the shell for braking the magnetic circuit components, which include a brake lining D-8, an oil distribution sleeve D-7 and an oil cylinder equipped with a piston D-5. The brake lining D-8 includes an annular thin-wall deformation part D-8-B, and the upper connection part and the bottom connection part, which are respectively located at the two ends of the thin-wall deformation part, and the upper connection part and the bottom connection part all contact thin-wall deformation part D-8-B, and the upper connection part D-8-A and the bottom connection part D-8-C are respectively tightly-coupled with the oil distribution sleeve D-7 through the sealing ring D-10, and the brake lining D-8 and the oil distribution sleeve D-7 together make up a hydraulic oil vessel, and further including connecting channels D-11 in the oil distribution sleeve D-7 which connect the oil cylinder with the hydraulic oil vessel, and the sealing rings D-9 are between the oil distribution sleeve D-7 and the oil cylinder; when the hydraulic oil is pressed and flows from the oil cylinder into the hydraulic oil vessel, the thin-wall deformation part D-8-B will press the magnetic ring E1 and brake the magnetic circuit components; when the hydraulic oil flows back to the oil cylinder, there will be gaps between the thin-wall deformation part D-8-B and the magnetic ring E1 so the magnetic circuit components can rotate with the motor rotor.

When the sum of the maximum angular displacement (peak-peak value) that the vibration table B-1 can output and the angle that the effective wires in the moving coil occupies (effective wires mean the axial wires in the magnetic field) is greater than the fanlike angle of the magnets E-3, the angular vibrator is then working in the large displacement and low frequency operating state, and in this state there are gaps between the thin-wall deformation part in the brake components and the magnetic ring, so the motor will drive the magnetic circuit components to rotate with the moving coil components synchronously, which ensures the effective wires of the moving coil components are always located in the effective magnetic field formed by the magnetic circuit components. According to the existing technology, because the position of the magnetic circuit is fixed, the maximum angle, at which the moving coil components could rotate, cannot be beyond the maximum fanlike angle of a single fanlike magnet, which is 180 degrees. So the maximum angular displacement is only restricted at 180 degrees. However, the present invention makes the magnetic circuit components rotate with the moving coil components synchronously when the motor drives the magnetic circuit components to rotate, that is to say, the effective wires are always be located in the effective magnetic field covered by magnets when the magnetic circuit components keeps relatively static with the moving coil components, so it can realize that the output angular displacement of the moving coil components can be beyond 180 degrees, then the large angular displacement output from the angular vibrator could be realized; in addition, the moving coil components move in a unipolar magnetic field, which avoids the commutation torque ripple and electromagnetic torque ripple that will happen when a conventional motor is adopted to realize a large angular displacement, so the angular vibrator, which is put forwards in the present invention, can output the waveform with low distortion.

When the sum of the maximum angular displacement (peak-peak value) that the vibration table can output and the angle that the effective wires in the moving coil occupies is less than the fanlike angle of the magnets, the angular vibrator is then working in the small displacement and high frequency operating state. In this state, the motor powers down and is in non-working status, and the magnetic circuit components are locked by the brake components and the magnetic circuit components are braked, so the influence of the vibration from the magnetic circuit component on the output angular vibration waveform is avoided when the angular vibrator outputs a large angular acceleration, and the waveform distortion is further improved when the angular vibrator output high frequency and large acceleration vibration.

Further, the fittings include the rotating components and the connecting ring E-5, and the rotating components include the spindle E-10 that is fixed on the center of the base F-2 and the rotatable swivel E-4 installed on the spindle E-10, and rolling bearings are equipped between the spindle E-10 and the swivel E-4.

The spindle E-10 plays the role in positioning, and the swivel E-4 rotates around the spindle E-10; the motor rotor E-6, the swivel E-4, the fittings E-5, the central magnetic pole E-2, the magnets E-3 and the magnetic ring E-1 together form a synchronous rotating body of revolution; as a power source, the motor rotor drives the whole rotating body to revolve.

The size of the magnetic ring E-1 is greater than that of the swivel E-4, so, the connecting ring E-5 is designed as the above part is big, for the bottom part is small. The shape like two cylindrical rings; the big end of the connecting ring E-5 is fixed with magnetic ring E-1 and the small end is fixed with swivel E-4.

Figure 3:
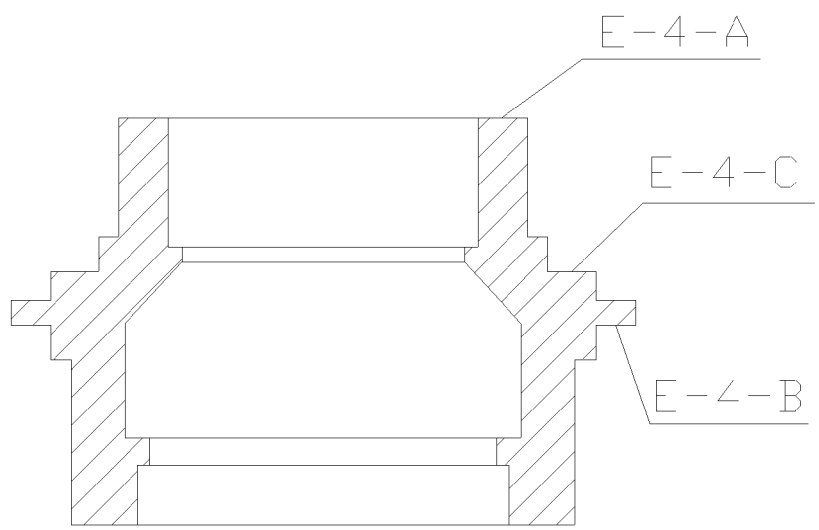
FIG. 3 is a schematic diagram of the swivel.
Figure 4:
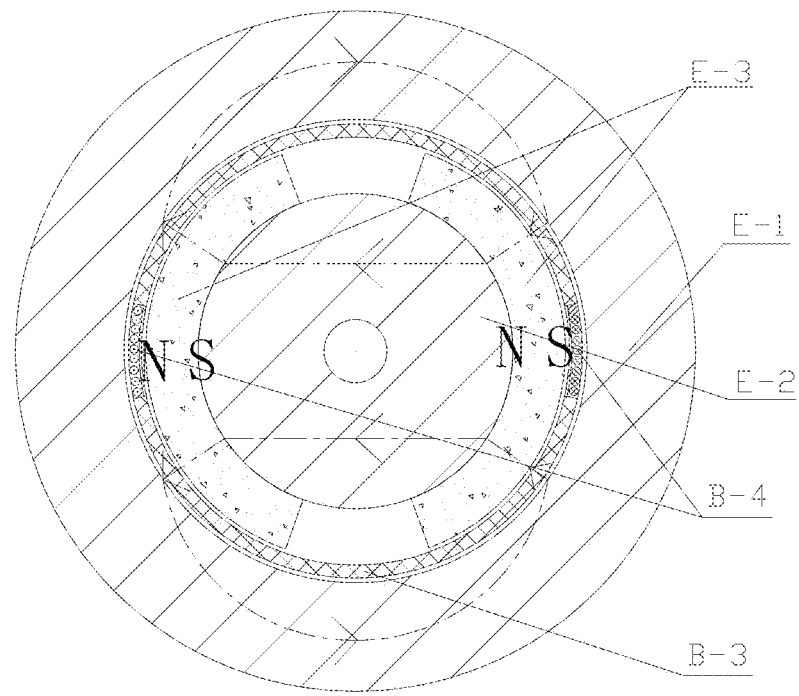
FIG. 4 is a schematic diagram of the magnetic circuit components.
Figure 5:
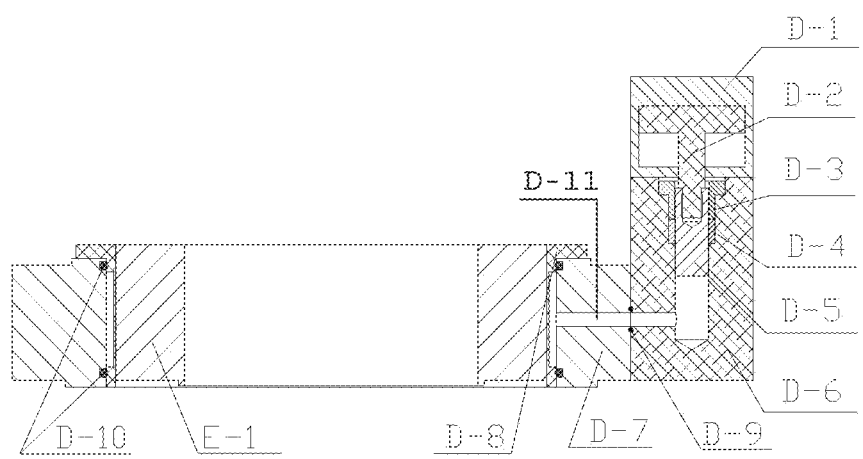
FIG. 5 is a schematic diagram of the brake components.
Figure 6:
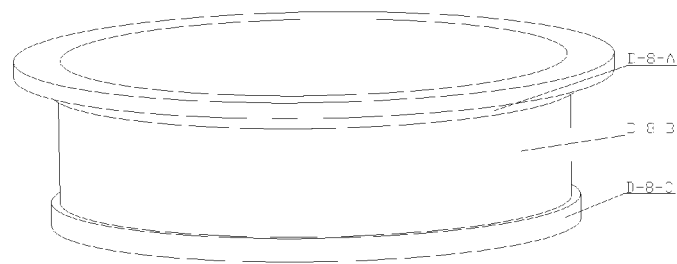
FIG. 6 is a schematic diagram of the brake lining.
Figure 7:
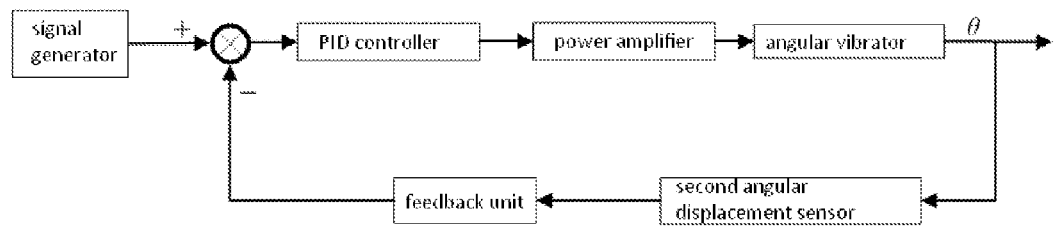
FIG. 7 is a schematic diagram of the electrical viscoelastic feedback control components.
Figure 8:
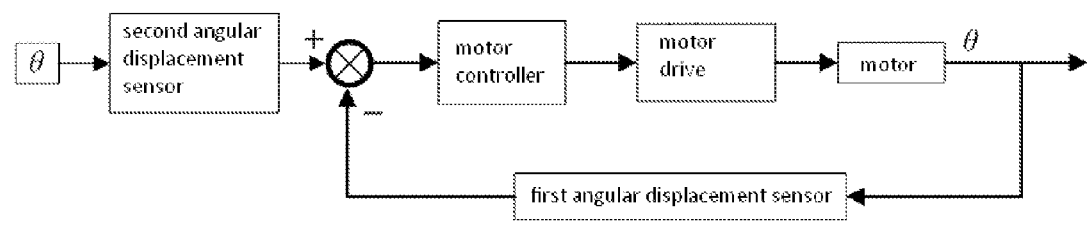
FIG. 8 is a schematic diagram of the motor feedback control components.

As shown in FIG. 3, the swivel E-4 includes the first connection part E-4-A which is fixed with central magnetic pole E-2, the second connection part E-4-B which is fixed with motor rotor E-6 and the third connection part E-4-C which is fixed with connecting ring E-5. One side of the connecting ring E-5 is fixed with the magnetic ring E-1 and the other side is fixed with the third connection part E-4-C of the swivel.

Because the size and the position of the central magnetic pole E-2, the motor rotor E-6 and the connecting ring E-5 are all different, in order to fix the central magnetic pole E-2, the motor rotor E-6 and the connecting ring E-5 together on the same swivel, the shape and structure of swivel E-4 are further limited as: the swivel E-4 includes the upper cylindrical ring section, the bottom cylindrical ring section and the linked section for connecting the upper and bottom cylindrical ring section, and the linked section is conical with a big bottom and a small top, and the upper cylindrical ring section is fixed with the central magnetic pole to be the first connection part E-4-A, and an annular wing, which extends outward, is designed on the outer wall of the bottom cylindrical ring section and fixed with the motor rotator as the second connection part E-4-B, and a step is designed on the linked section to support the connecting ring E-5, and the surface of the step is fixed with the connecting ring E-5 to be the third connection part E-4-C, and the whole swivel is made as one integrated body.

An upper rolling bearing E-11-A and a bottom rolling bearing E-11-B are designed between the spindle E-10 and the swivel E-4, and an upper bench is designed on the inner surface of the upper cylindrical ring section of the swivel E-4 to support the upper rolling bearing, and a round nut E-12 are designed on the spindle E-10 for pressing the inner ring of the upper rolling bearing E-11-A, a washer E-13 is designed between the round nut E-12 and the upper rolling bearing E-11-A, and a bottom bench is designed at the bottom of the bottom cylindrical ring section of the swivel to press the outer ring of the bottom rolling bearing E-11-B, and a support board is designed at the bottom of the spindle E-10 to support the inner ring of the bottom rolling bearing E-11-B.

The first circular grating E-14 is designed on the connecting ring E-5, and the first reading head E-15 and its mounting bracket E-16 is designed on an pressing plate E-8, and the first circular grating E-14 and the first reading head E-15 together become the first angular displacement sensor to detect the movement of motor, and the pressing plate E-8 is fixed on the support base E-9 of the motor and is pressed on the motor stator E-7 to fix the motor stator E-7, and the pressing plate E-8 is a ring-shaped connecting plate.

The present invention further sets up the spiral cooling groove E-71 at outer surface of motor stator E-7, so the motor stator E-7 and motor support base E-9 together produce a sealed spiral cooling chamber, and sealing rings E-72 are designed between the motor stator E-7 and motor support base E-9 to prevent the leakage of coolant fluid. An upper sealing ring and a bottom sealing ring are designed at the upper and bottom end of spiral cooling chamber respectively, and the two seal grooves are designed on the motor stator E-7 to accommodate the two sealing rings E-72, and the incoming channel E-91 and the escape channel E-92 for coolant liquid are designed on the motor support base E-9.

Furthermore, the oil cylinder piston D-5 in the brake components is fixed with the pushrod D-2 of the brake air cylinder D-1, the oil cylinder in the brake components contains a cylinder body D-6, a piston D-5 that is adapted with the inner cavity of the cylinder body D-6, seals D-4 and their adjustments that are designed on the cylinder body D-6, the seals D-4 are sealed with the piston D-5, and holding tanks are designed on the cylinder body D-6 to accommodate the seals D-4 and their adjustments D-3, the steps for supporting the seals D-4 are formed on the holding tanks and the upper section of the cylinder body D-6, and the sealing adjustments D-3 press the seals D-4 through the steps, so the sealing adjustments D-3 is used for adjusting the tightness of seals D-4. When the pushrod D-2 of the brake air cylinder D-1 is pushed downward, the hydraulic oil will be pressed from the oil cylinder to the hydraulic oil vessel, and the thin-wall deformation part D-8-B will tightly compress the magnetic ring E-1 and brake the magnetic circuit components. When the brake air cylinder D-1 is reset and the hydraulic oil flows back to the oil cylinder, the thin-wall deformation part D-8-B will return to its original shape, and there will be gaps between the thin-wall deformation part D-8-B and the magnetic ring E-1 again.

The electrical viscoelastic feedback control components contains the second angular displacement sensor, a feedback unit, a signal generator, a subtracter, a PID controller, a power amplifier and the angular vibrator; the second angular displacement sensor includes the second reading head A-2 and second circular grating A-1, and the second circular grating A-1 is installed on the vibration table B-1, and the second reading head A-2 is installed on the bearing sleeve C-1 of the air bearing through a mounting rack A-3; the second angular displacement sensor is used for detecting the angular displacement signal of the moving coil components and the vibration table B-1, and the signal is input to the feedback unit, and the feedback unit amplifies the signal to be the first output signal, and the derivative of the signal is also got and then amplified to be the second output signal, and the output signal of the feedback unit is got after the first output signal and the second output signal are superimposed, and the difference between the output signal of the feedback unit and the standard signal generate by the signal generator is got to be a deviation signal, then the deviation signal is processed by the PID controller and then the output signal is amplified by the power amplifier, and drives the angular vibrator to move to realize the electrical viscoelastic feedback control for the rotating parts of the angular vibrator.

Due to the nonlinear problems of mechanical springs when they are working in large angular displacement, the output angular waveform from the angular vibrator will seriously distorted but the electrical viscoelastic feedback control components are equivalent to a spring whose stiffness and damping are linear and adjustable, so it can improve and reduce the distortion of the output angular waveform form the angular vibrator.

The closed-loop control components for controlling the movement of the motor are composed of the second angular displacement sensor that detects the movement of moving coil components, a subtracter, a motor controller, a motor drive and the first angular displacement sensor that detects the angular displacement of the motor; its implementation processes include: the first angular displacement sensor detects the angular displacement of the motor and the result is input to the subtracter, and then do the subtract with the angular displacement signal detected by the second angular displacement sensor, and the deviation signal is processed by motor controller and then the result is input to the motor drive, whose output drives the motor to rotate, and this processes will make it sure that the moving coil components and the magnetic circuit components will rotate synchronously.

The shell includes a barrel F-3 fixed on the base F-2 and a damping block F-1 fixed on the bearing sleeve C-1 of the air bearing, and the brake components is installed between the barrel F-3 and the damping block F-1.

The advantages of the present embodiment are:

1. The broadband large displacement vibration is realized when being equipped with a brake components and a motor in the present invention. When the brake components brakes the magnetic circuit components and the motor is inactive, the dynamic characteristics of the system is only depended on the rotating components, whose main subject is the moving coil, in the angular vibrator, which means that the angular vibrator could work at high frequency, and the angular vibrator is working in the small displacement and high frequency state; when there are gaps between the brake components and the magnetic circuit components and the motor is active, the angular vibrator is then working in the large displacement and low frequency state, and the rotating components of the angular vibrator can output large displacement.

2. In the present invention, when the sum of the maximum angular displacement (peak-peak value) that the vibration table can output and the angle that the effective wires in the moving coil occupies is greater than the fanlike angle of the magnets, the angular vibrator is asked to work in the large displacement and low frequency operating state, and the motor is adopted to drive the magnetic circuit components to rotate, and make sure that the magnetic circuit components will rotate with the moving coil component synchronously, also with fast response, accurate positioning and good performance; the output angular displacement (single-peak value) of the angular vibrator can reach more than 180 degrees, which meets the demands for the calibration of angular vibration sensors with low frequency response and large angular displacement.

3. In the present invention, when the sum of the maximum angular displacement (peak-peak value) that the vibration table can output and the angle that the effective wires in the moving coil occupies is less than the fanlike angle of the magnets, the angular vibrator is then asked to work in the small displacement and high frequency operating state. then the magnetic ring is braked by the brake components, where the air cylinder is adopted as power source, and the gas source comes from the same branch as air bearing, and the power source has advantages of smooth lock, simple structure and convenient operation, etc.

4. In the present invention, the permanent magnets are adopted in the magnetic circuit structure, where the excitation coil is eliminated, and the loss of the excitation system is reduced, and the efficiency of the energy conversion is improved, and the magnetic circuit structure is simple, compact and reliable for operation.

5. In the present invention, the electrical viscoelastic is adopted to control the equilibrium position of the rotating parts with the feedback technology. The traditional mechanical spring has the shortage of nonlinear, time-varying, hysteresis, and so on, which impact the output waveform distortion form the angular vibrator. However, the electrical viscoelastic based on feedback control technology has advantages of linear, time-invariant, no hysteresis, and so on, which reduce the output waveform distortion.

Embodiment 2

Figure 9:
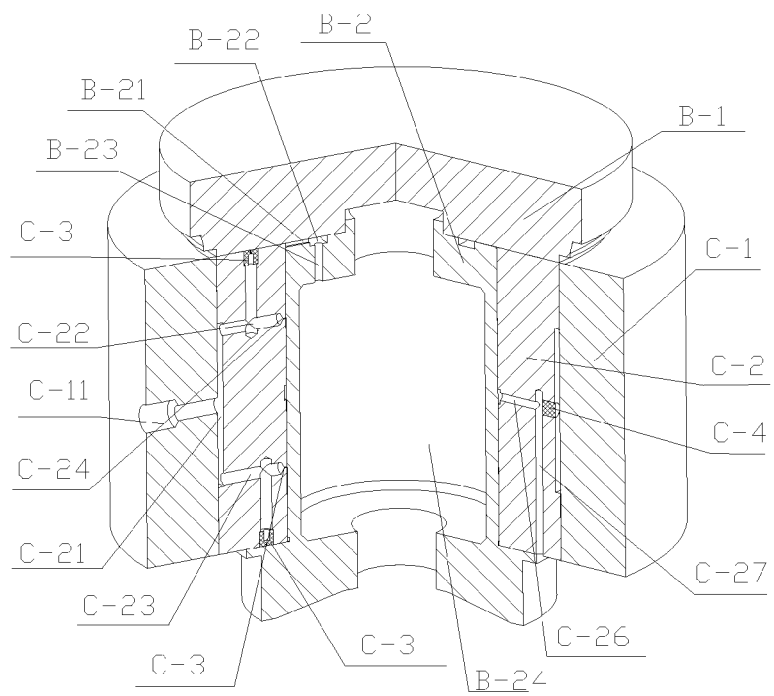
FIG. 9 is a schematic diagram of the air bearing.

FIG. 9 as reference.

The components and structure of the present embodiment are all the same as the embodiment 1 except the concrete structure of the air bearing.

Specifically, the air bearing includes a bearing sleeve C-1 and a bearing body C-2, a main spindle B-2 joined in the bearing body C-2, and the bearing body C-2 is joined in the bearing sleeve C-1, and bearing sleeve C-1 is fixed with bearing body C-2, and a step is designed at the bottom of the main spindle B-2 to fit with the bearing body C-2;

A circular inlet groove C-21 is designed on the outside surface of the bearing body C-2, and an air inlet C-11 is designed on the bearing sleeve C-1, which is connected with the inlet groove C-21, and radial gas ports are designed on the bearing body C-2 to guide the gas to the gaps between the bearing body C-2 and the main spindle B-2, and the upper axial gas ports are designed on the bearing body to guide the gas to the gaps between the bearing body C-2 and the vibration table B-1, and the bottom axial gas port are designed on the bearing body to guide the gas to the gaps between the bearing body C-2 and the step of the main spindle B-2, and orifices C-3 are designed at the outlet ends of the radial gas port, the upper axial gas ports and the bottom axial gas ports, respectively, and they are uniformly distributed along the circumferential direction.

The air inlet C-11, the inlet groove C-21, the radial gas ports, the upper axial gas ports and the bottom axial gas ports compose the inlet channel, and the air inlet C-11 is connected with the high pressure gas source.

The upper axial gas ports are connected with the first radial gas ports, which forms an upper T-like airway C-22, and the bottom axial gas ports are connected with the second radial gas ports, which forms an bottom T-like airway C-23, and the upper T-like airway C-22 and the bottom T-like airway C-23 are symmetrically arranged, and the first radial gas ports and the second radial gas ports are connected with the inlet groove C-21.

A gap between the upper end face of the bearing body C-2 and the bottom end face of the vibration table B-1 forms the gas film named the upper thrust gas film; an gap between the bottom end face of the bearing body C-2 and the upper end face of the step on the main spindle forms the gas film named the bottom thrust gas film; a gap between the bearing body C-2 inner surface and the main spindle B-2 outer surface forms the gas film named the axial neck part gas film; the upper thrust gas film, the bottom thrust gas film and the axial neck part gas film together make the main spindle and the bearing body do not touch with each other directly, then the friction is reduced, and the distortion of output waveform is reduced.

In order to optimize the exhaust performance of the air bearing and keep the gas film uniform and stable, we further limit the structure as: the main spindle B-2 is hollow to form an exhaust cavity, and the first exhaust channels are designed on the upper end of the main spindle B-24 to guide the gas between the bearing body C-2 and the vibration table B-1 to the exhaust cavity B-24, and the second exhaust channels are designed on the bearing body C-2 to guide the gas between the main spindle B-2 and the bearing body C-2 to exhaust outside, and the exhaust port of the second exhaust channels is located outside of the main spindle step, and the second exhaust channels are evenly distributed on the bearing body C-2 and are isolated with the inlet groove C-21.

The first exhaust channels include a circular groove B-22 that is designed on the upper surface of the main spindle B-2, pores B-21 that discharge the gas between the bearing body C-2 and the vibration table B-1 into the circular groove B-22 and axial holes B-23 that discharge the gas in the circular groove B-22 into the exhaust cavity B-24; the pores B-21 are multiple and uniformly distributed along the circular groove B-22; the axial holes are also multiple and uniformly distributed along the circular groove; and the pores B-21 are opened along the radial direction of the main spindle B-2 upper surface, and the axial holes B-23 are opened along the main spindle axial direction B-2.

The second exhaust channels include the radial exhaust hole C-26 and the axial exhaust hole C-27, and one side of the radial exhaust hole C-26 is connected with the gas film between the bearing body C-2 and the main spindle B-2, but the other side is connected with the axial exhaust hole C-27; the air outlet of the axial exhaust hole C-27 is also the air outlet of the second exhaust channels; the radial exhaust hole C-26 guides the gas in the neck part gas film into the axial exhaust hole C-27 and then discharge from the axial exhaust hole C-27 to the outside.

The radial exhaust hole C-26 runs through the bearing body C-2, and end caps C-4 are designed on the end of the radial exhaust holes C-26 where the inlet groove C-21 is connected, which avoids the gas in the second exhaust channels to flow into the inlet groove C-21 and keeps the second exhaust channels and the inlet groove independence with each other, and also make it convenient for the radial exhaust hole C-26 to be machined in the meantime.

The shell includes a barrel F-3 fixed on the base F-2 and a damping block F-1 fixed on the bearing sleeve C-1 of the air bearing, and the brake components is installed between the barrel F-3 and the damping block F-1; the exhaust cavity B-24 is connected with the space among the moving coil components, the central magnetic pole E-2 and the magnets E-3, the second exhaust channel is connected with the space among the damping block F-1 and the moving coil components; the gas in the upper thrust gas film is discharged into the exhaust cavity B-24 through the first exhaust channel discharges, and then the gas flows into the space among the moving coil components, the central magnetic pole E-2 and the magnets E-3, which plays the role in cooling the moving coil components; the gas in neck part gas film is discharged into the space among the moving coil components and damping block F-1 through the second exhaust channels, which also plays the role in cooling the moving coil components; except the moving coil components, the gas from the first exhaust channels and the second exhaust channels finally flows through the exhaust path including the center holes on the central magnetic pole E-2, the spindle E-10 and the base F-2, and the air vent F-21 on the bottom surface of the base, and then goes into the atmosphere.

The advantage of present Embodiment are: the air bearing support is adopted, and the formed upper thrust gas film, bottom thrust gas film and axial neck part gas film realize the axial and radial support for the rotating parts of the moving coil, and no contact support is realized for the rotating parts and the stationary parts through the gas films, which has the advantages of no friction or small friction, smooth running, improving the rotary accuracy of the rotating parts, improving the output waveform distortion from the angular vibrator and reducing the transverse oscillating quantity. In addition, the gas spills from the gas film of air bearing also have the effect of cooling the moving coil components.

Embodiment 3

Figure 10:
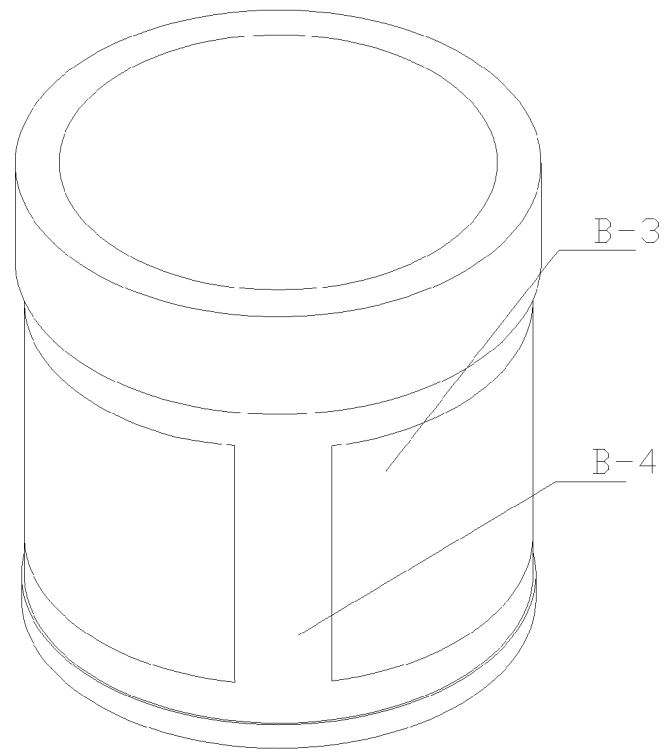
FIG. 10 is a 3D view of the moving coil components.
Figure 11:
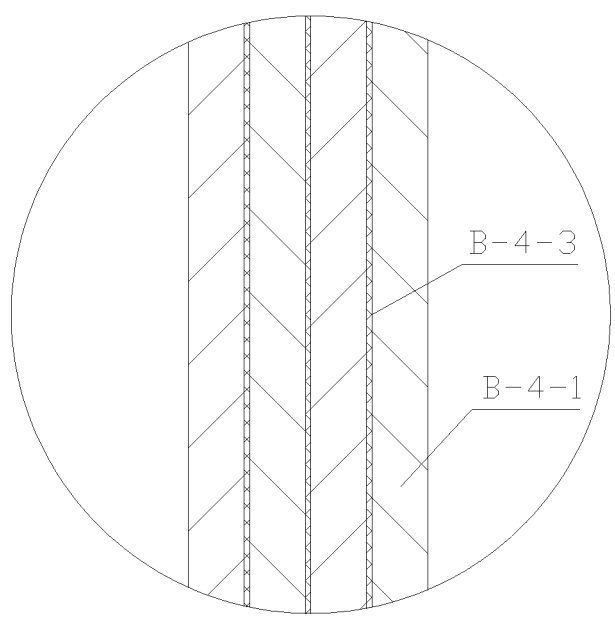
FIG. 11 is a distribution sketch of the coil winding and insulation layer.
Figure 12:
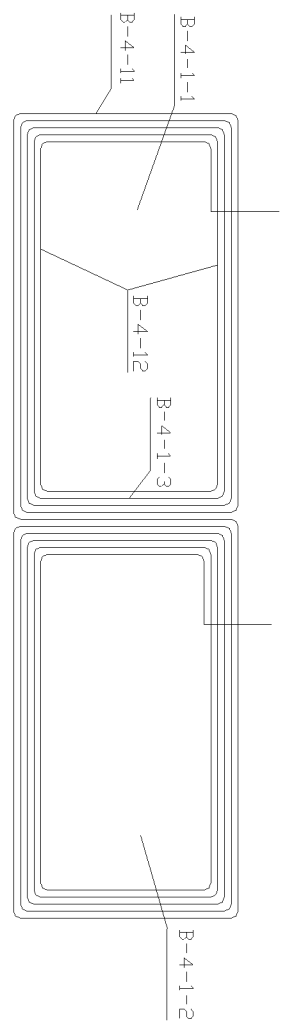
FIG. 12 is a 2D winding diagram of the coil winding.

FIGS. 10-12 as reference.

The components and structure of the present embodiment are all the same as the embodiment 1, except the coil of the moving coil.

As shown in FIG. 10, the coil B-4 of the moving coil components is covered on the outer flank of the moving coil substrate B-3, and as shown in FIG. 11, the coil includes coil windings B-4-1 and insulation layers B-4-3, which are alternatively set, and there is at least one coil winding layer. The insulation layers B-4-3 are made of the epoxy and the glass cloth, which will cover the coil windings B-4-1 completely. AS shown in FIG. 12, the coil windings includes the first coil B-4-1-1 and the second coil B-4-1-2, and the first coil B-4-1-1 is counterclockwise winded from inside to outside, and the second coil B-4-1-2 is clockwise winded from outside to inside, and the first coil and the second coil are on the same layer, and wounded with multi-turn, each of which is composed by effective wires B-4-11 and connecting conductors B-4-12, and the galvanical effective wires B-4-

11 produce ampere force when they are put in the magnetic field, and the connecting conductors B-4-12 are put outside the magnetic field.

The equal-interval-distributed effective wires B-4-11 compose an ampere-force-occurring part B-4-1-3, and the number of ampere-force-occurring parts B-4-1-3 is twice the number of coil windings B-4-1, and each ampere-force-occurring part B-4-1-3 contains the same quantity of effective wires B-4-11, and the epoxy is filled between each turn of the coil winding B-4-1, and the coil windings B-4-1 are connected with each other in series or parallel.

When coil windings B-4-1 is made, a copper plate is first made, which can cover the outer surface of the moving coil substrate B-3 exactly, and the line shape and line way of the coil winding B-4-1 are machined on the plate through wire-electrode cutting or carving as FIG. 12, then the coil windings made of the copper plate are fixed on the outer surface of the moving coil substrate B-3 through winding, and at the same time the glass cloth is wound at the outer surface of the coil windings B-4-1 and the middle hollowed area and the epoxy is poured on the cloth, and the cloth is wound while the epoxy is poured. After the epoxy is solidified, the current coil winding B-4-1 and moving coil substrate B-3 will be machined to be a new smooth and flat cylindrical moving coil substrate B-3 through turning process. When the next layer of the coil winding B-4-1 is made, another copper plate will be prepared on the outer surface of the new moving coil substrate B-3, and the new coil winding B-4-1 is wound in the same way as that of the former coil windings B-4-1, and each ampere-force-occurring part of the moving coil windings B-4-1 should be kept alignment and overlapped with each other, and the other layers of coil windings B-4-1 are made in the same way.

The corner between the effective wires B-4-11 and the connecting conductors B-4-12 of the coil windings B-4-1 should be keep smooth transitions to avoid the damage and stress concentration when processing and fixing the coil windings B-4-1.

Because the direction of the current in the wires of the adjacent ampere-force-occurring part is opposite when they are wound, in order to make the ampere forces be superposed, the magnets E-3 is limited as follow: the magnets E-3 should be uniformly distributed along the circumference of the central magnetic pole E-2; the magnetization direction of the magnets E-3 are radial, and the magnetization direction of the adjacent magnets E-3 is opposite, and the magnets E-3 are fixed on central magnetic pole E-2.

The advantage of the present invention is: the coil windings of the moving coil components is machined by wire-electrode cutting or carving, which have the advantages of uniformly wiring, uniform stress, reducing the winding difficulty of the coil windings at the same time and simplifying the wiring process.

The specific embodiments discussed are merely illustration of specific ways to make and use the invention, and do not limit the scope of the invention. Meanwhile, it should be appreciated that various modifications and their equivalents can be devised by those skilled in the art and will fall within the spirit and scope of the principles of the disclosure.

What is claimed is:

1. A broadband and large displacement angular vibrator includes a shell, a vibration table, a main spindle which drives the vibration table to rotate, moving coil components, magnetic circuit components, brake components, a motor that drives the magnetic circuit components to rotate and its closed-loop control components, electrical viscoelastic feedback control components, an air bearing and an angular displacement sensor;

wherein the main spindle and the moving coil components are fixedly connected, and the magnetic circuit components are fixedly connected with the motor rotor by a connector;

wherein the moving coil components include a moving coil substrate connected to the main spindle, a coil wrapped around the moving coil substrate, and the moving coil substrate is fixedly connected with the main spindle;

wherein the magnetic circuit components include a magnetic ring, a central magnetic pole and magnets, and the closed magnetic circuit is produced by the magnetic ring, the central magnetic pole, the magnets and the air gap; the central magnetic pole is located in the magnetic ring and it is coaxial with the magnetic ring, and the magnets are located between the magnetic ring and the central magnetic pole, and the magnets affixed to the central magnetic pole, wherein the moving coil components are located between the magnets and the magnetic ring, and the magnetic ring and the moving coil components are coaxial;

wherein brake components are on the shell for braking the magnetic circuit components, which include a brake lining, an oil distribution sleeve and an oil cylinder equipped with a piston, wherein the brake lining includes an annular thin-wall deformation part, an upper connection part and an bottom connection part, which are respectively located at the two ends of the thin-wall deformation part, and an upper connection part and a bottom connection part all contact the thin-wall deformation part, and the upper connection part and the bottom connection part are respectively tightly-coupled with the oil distribution sleeve through sealing rings, and the brake lining and the oil distribution sleeve together make up a hydraulic oil vessel, and further including connecting channels in the oil distribution sleeve which connect the oil cylinder with the hydraulic oil vessel, and the sealing rings are between the oil distribution sleeve and the oil cylinder;

wherein when the hydraulic oil is pressed and flows from the oil cylinder into the hydraulic oil vessel, the thin-wall deformation part will press the magnetic ring and brake the magnetic circuit components;

wherein when the hydraulic oil flows back to the oil cylinder, there will be gaps between the thin-wall deformation part and the magnetic ring so the magnetic circuit components can rotate with the motor rotor.

2. A broadband and large displacement angular vibrator according to claim 1, wherein the fittings include the rotating components and a connection ring, and the rotating components include the spindle that is fixed on the center of the base and a rotatable swivel installed on the spindle, and rolling bearings are arranged between the spindle and the swivel.

3. A broadband and large displacement angular vibrator according to claim 2, wherein the swivel includes a first connection part which is fixed with the central magnetic pole, a second connection part which is fixed with the motor rotor and a third connection part which is fixed with the connecting ring.

4. A broadband and large displacement angular vibrator according to claim 3, wherein the first circular grating is designed on the connecting ring, and a first reading head and its mounting bracket is defined on a pressing plate, and the first circular grating and the first reading head together become a first angular displacement sensor to detect the movement of motor, and the pressing plate is fixed on the support base of the motor and is pressed on the motor stator to fix the motor stator, and the pressing plate is a ring-shaped connecting plate.

5. A broadband and large displacement angular vibrator according to claim 4, wherein the oil cylinder piston in the brake components is fixed with the pushrod of the brake air cylinder, the oil cylinder in the brake components contains a cylinder body, a piston is adapted with the inner cavity of the cylinder body, seals and adjustments for the seals that are designed on the cylinder body, wherein the seals are sealed with the piston, and holding tanks are defined on the cylinder body to accommodate the seals, wherein steps for supporting the seals are formed on the holding tanks and the upper section of the cylinder body, and the sealing adjustments pressure the seals through the steps.

6. A broadband and large displacement angular vibrator according to claim 5, wherein the electrical viscoelastic feedback control components contains a second angular displacement sensor, a feedback unit, a signal generator, a subtracter, a PID controller, a power amplifier and an angular vibrator; wherein a second angular displacement sensor includes a second reading head and a second circular grating, and the second circular grating is installed on the vibration table, and the second reading head is installed on the bearing sleeve of the air bearing through a mounting rack; the second angular displacement sensor is used for detecting the angular displacement signal of the moving coil components and the vibration table, and the signal is input to the feedback unit, and the feedback unit amplifies the signal to be a first output signal, and the derivative of the signal is also then amplified to be a second output signal, and the output signal of the feedback unit is received after the first output signal and the second output signal are superimposed, and the difference between the output signal of the feedback unit and the standard signal generated by the signal generator is a deviation signal, then the deviation signal is processed by the PID controller and then the output signal is amplified by the power amplifier, and drives the angular vibrator to move to realize the electrical viscoelastic feedback control for the rotating parts of the angular vibrator.

7. A broadband and large displacement angular vibrator according to claim 1, wherein the air bearing includes a bearing sleeve and a bearing body, a main spindle sleeve is joined in the bearing body, and the bearing body is joined in the bearing sleeve, and bearing sleeve is fixed with the bearing body, and a step is designed at the bottom of the main spindle to fit with the bearing body;
a circular inlet groove is defined on the outside surface of the bearing body, and an air inlet is defined on the bearing sleeve, which is connected with the inlet groove, and radial gas ports are designed on the bearing body to guide the gas to the gaps between the bearing body and the main spindle, and the upper axial gas ports are defined on the bearing body to guide the gas to the gaps between the bearing body and the vibration table, and the bottom axial gas ports are defined on the bearing body to guide the gas to the gaps between the bearing body and the step of the main spindle, and orifices are defined at the outlet ends of the radial gas ports, the upper axial gas ports and the bottom axial gas ports, respectively, and are uniformly distributed along the circumferential direction.

8. A broadband and large displacement angular vibrator according to claim 7, wherein the main spindle is hollow to form an exhaust cavity, and the first exhaust channels are defined on the upper end of the main spindle to guide the gas between the bearing body and the vibration table to the exhaust cavity, and second exhaust channels are defined on the bearing body to guide the gas between the main spindle and the bearing body to exhaust outside, and the exhaust port of the second exhaust channels is located outside of the main spindle step, and the second exhaust channels are evenly distributed on the bearing body and are isolated with the inlet groove;
wherein the first exhaust channels include a circular groove that is defined on the upper surface of the main spindle, pores that discharge the gas between the bearing body and the vibration table into the circular groove and axial holes that discharge the gas in the circular groove into the exhaust cavity; the pores are multiple and uniformly distributed along the circular groove; the axial holes are multiple and uniformly distributed along the circular groove; and the pores are opened along the radial direction of the main spindle upper surface, and the axial holes are opened along the main spindle axial direction;
wherein the second exhaust channels include a radial exhaust hole and an axial exhaust hole, and one side of the radial exhaust hole is connected with the gas film between the bearing body and the main spindle, and the other side is connected with the axial exhaust hole; the air outlet of the axial exhaust hole is the air outlet of the second exhaust channels; the radial exhaust hole guides the gas in the neck part gas film into the axial exhaust hole and then discharges from the axial exhaust hole to the outside;
wherein the radial exhaust hole runs through the bearing body, and end caps are defined on the end of the radial exhaust holes where the inlet groove is connected.

9. A broadband and large displacement angular vibrator according to claim 8, wherein the shell includes a barrel fixed on the base and a damping block fixed on the bearing sleeve of the air bearing, and the brake components are installed between the barrel and the damping block; the exhaust cavity is connected with the space among the moving coil components, the central magnetic pole and the magnets.

10. A broadband and large displacement angular vibrator according to claim 8, wherein the coil of the moving coil components is covered on the outer flank of the moving coil substrate, and the coil includes coil windings and insulation layers, which are alternatively arranged, and there is at least one coil winding layer, wherein the insulation layers are made of epoxy and glass cloth, which cover the coil winding completely;
wherein each coil winding includes a first coil and a second coil, and the first coil is counterclockwise winded from inside to outside, and the second coil is clockwise winded from outside to inside, and the first coil and the second coil are on the same layer, and are multiturn winding, each of which is composed by effective wires and connecting conductors, and the galvanical effective wires produce ampere force when they are put in the magnetic field, and the connecting wires are put outside the magnetic field;
wherein the equal-interval-distributed effective wires compose an ampere-force-occurred part, and the number of ampere-force-occurring parts is twice the number of coil windings, and each ampere-force-occurring part contains the same quantity of effective wires, and epoxy is filled between each turn of the coil winding, and the coil windings are connected with each other in series or parallel.

* * * * *